United States Patent
Pop-Iliev et al.

(10) Patent No.: US 8,628,704 B2
(45) Date of Patent: Jan. 14, 2014

(54) RAPID ROTATIONAL FOAM MOLDING PROCESS

(76) Inventors: Remon Pop-Iliev, Mississauga (CA); Kimbery Anne Christian, Ajax (CA); Emad Samy Abdalla, Oshawa (CA)

( * ) Notice: Subject to any disclaimer, the term of this patent is extended or adjusted under 35 U.S.C. 154(b) by 0 days.

(21) Appl. No.: 13/050,685

(22) Filed: Mar. 17, 2011

(65) Prior Publication Data

US 2011/0221089 A1 Sep. 15, 2011

Related U.S. Application Data

(63) Continuation of application No. 12/379,782, filed on Feb. 27, 2009, now abandoned, which is a continuation-in-part of application No. PCT/CA2008/000814, filed on May 1, 2008.

(51) Int. Cl.
*B29C 35/02* (2006.01)

(52) U.S. Cl.
USPC ............................ 264/45.7; 425/429; 425/425

(58) Field of Classification Search
USPC .......... 264/45.7, 54, 125, 113–114, 255, 302, 264/310–311, 45.1, 45.4, 46.4, 46.6, 259, 264/267
See application file for complete search history.

(56) References Cited

U.S. PATENT DOCUMENTS

| | | | |
|---|---|---|---|
| 6,103,153 A * | 8/2000 | Park et al. | 264/45.7 |
| 6,516,736 B1 * | 2/2003 | Van Lancker | 114/61.1 |

FOREIGN PATENT DOCUMENTS

JP 2002307428 A * 10/2002

OTHER PUBLICATIONS

English abstract, JP2002307428.*

* cited by examiner

*Primary Examiner* — Larry Thrower
*Assistant Examiner* — Xue Liu
(74) *Attorney, Agent, or Firm* — Hill & Schumacher

(57) ABSTRACT

The nature of the rotational molding process is cyclic. It requires the temperature of the rotating mold and the plastic it is charged with to be elevated from room temperature to beyond its melting temperature and then cooled back to room temperature. Consequently, rotational molding cycle times are lengthy, which is often considered as the fundamental drawback of this plastic fabrication process. The motivation and objectives of this disclosure are twofold. The presently proposed invention focuses on developing an innovative extrusion-assisted rotational foam molding processing technology for the manufacture of integral-skin cellular composite moldings having adjacent, but clearly distinct, layers of non-cellular and cellular structures, consisting of identical or compatible polymeric grades. Its primary goal is to significantly reduce the processing cycle time in comparison with respective currently implemented technologies by employing melt extrusion in order to maximize the speed of controlled polymer melting.

5 Claims, 13 Drawing Sheets

RAPID ROTATIONAL FOAM MOLDING PROCESS

CROSS REFERENCE TO RELATED PATENT APPLICATION

This patent application is a Continuation of U.S. application Ser. No. 12/379,312, filed Feb. 27, 2009 which is a National Phase Application of International Patent Application Serial No. PCT/CA2008/00814, filed on May 1, 2008, designating the United States, and entitled EXTRUSION ASSISTED ROTATIONAL FOAM MOLDING PROCESS, which is incorporated herein by reference in its entirety.

FIELD OF THE INVENTION

This invention relates to a rotational foam molding process and in particularly an extrusion assisted rotational molding process which exploits the synergistic effects resulting from the deliberate conjunction of extrusion with rotational molding. The process is well suited for speedy processing of polymeric integral skin rotational foam moldings and is referred to as Rapid Rotational Foam Molding.

BACKGROUND OF THE INVENTION

Rotational foam molding has lately been brought into being a distinct plastic processing technology. It has been developed by deliberately modifying the conventional rotational molding process to accommodate the need for fabrication of rotomolded foamed plastic articles. This technology advantageously allows for creating a foam layer or core in the interior of hollow moldings and thereby offers the capacity to deliver reinforced, large-sized, complex-shaped, single-piece, foamed plastic articles that can satisfy severe service requirements and achieve improved strength-to-weight ratios that no other process can provide. The nature of the rotational molding process is cyclic. In its simplest form, the rotational molding processing cycle consists of subjecting a pre-charged (with plastic), separable (cast or fabricated), vented, metal mold to biaxial rotation (or at least a rocking motion) into a heated area (oven), and subsequently, into a cooled environment (forced air, water, or a combination of these), after which the mold is opened, the solidified part removed, and the cycle repeated.

Essentially, the manufacture of rotational moldings with a distinct non-foamed outer skin that encapsulates entirely a foamed core or layer requires both non-foamable and foamable plastic resins to be charged into the mold within the same rotational molding cycle. This could be achieved either by interrupting the molding process, or continuously, in a single-shot fashion by charging the mold with predetermined quantities of both non-foamable and foamable resins simultaneously at the outset of the cycle, so that the use of drop boxes or plastic bags become unnecessary. This processing approach assumes simultaneous processing of a mix of non-foamable pulverized resins and pre-decomposition-free foamable solidified pellets that have been normally pre-processed in a remote extrusion-based melt compounding operation involving a carrier resin and a chemical blowing agent (CBA). However, in addition to being extremely time consuming and very energy-intensive, due to the unavoidable thermal gradient formed across the mold during both heating and cooling, the single-charge technique suffers from difficulties of controlling the timely formation of the solid skin versus the formation of a foamed core or layer of controlled density. This is often demonstrated through a premature decomposition of the CBA compounded into the foamable pellets, thereby causing poor skin thickness uniformity, foam invasion/protrusion into the skin, undesired coarse-celled foam morphologies and a weak skin-foam interface.

The rotational molding technology is inherently disadvantaged by very lengthy and energy-intensive processing cycles, which are even further aggravated when processing integral-skin plastic foams, due to the insulative effect of the developed foam layer or core within the mold. Rotational molding production cycles are, undesirably, lengthy because the plastic material charged into the bi-axially rotating mold has to be indirectly heated from room temperature to beyond its melting point (which is traditionally conducted by using convection-based heath transfer while implementing an oven) and then cooled back to room temperature (which is traditionally achieved by forced airflow and/or water sprinklers) until it eventually solidifies. In addition, the foam developed within the mold during processing produces an undesired insulative effect which slows down and practically precludes any real-time process control of both the heating and cooling segment of the cycle even further.

Consequently, this prevents the highly-desired fine-celled bubbles, originally nucleated and existing in the polymer melt, to be retained ("frozen") until cycle completion by deliberately inducing quick solidification of the melt, because of which the bubbles continue to grow beyond control and eventually shrink and disappear. These are the motivating factors for undertaking research aiming at developing a technology that will allow for fabricating high-quality fine-celled rotationally molded integral-skin polymeric cellular composites by enabling a more efficient control of the temperature of the melt within the mold than the currently achievable.

In any closed-cell polymeric foam production the ultimate goal is to achieve the highest possible cell size distribution uniformity, cell size reduction, and cell density augmentation. However, the control of the cell size of rotationally foam molded cellular structures formed based on the use of a chemical blowing agent (CBA) might be often aggravated by some inherent limitations that are unique to the rotational molding process such as lengthy processing cycles, which result in coarser-celled final cellular structures being yielded. Another reason is the fact that the polymer close to the internal mold surface continues to be heated even after its foaming is completed, simply because the interior polymer has yet to reach the decomposition temperature of the blowing agent. Even when cooling is applied to the mold, the recrystallization temperature in the melt is reached after several minutes, during which time bubble coalescence and collapsing begin to set out and accelerate. It is also inherent to the rotomolding process that, as the melt front progresses, the air pockets that have been entrapped inside the melt eventually become bubbles that will be subjected to diffusion controlled shrinkage and eventual disappearance. At a high enough melt temperature, the air in the bubbles begins to dissolve into the polymer. Since oxygen has about twice the solubility of nitrogen in polyethylene, at high temperatures, the oxygen is further depleted by direct oxidation reactions with polyethylene. The depletion of oxygen reduces the bubble diameter. Since the laws of surface tension dictate that the pressure inside the bubble has to increase as the diameter decreases, the increase in bubble pressure forces nitrogen to dissolve in the polymer thereby reducing the bubble diameter even further. This repeats until the bubble disappears.

The current state-of-the-art in rotational foam molding technology is the single-charge technique for fabricating integral-skin cellular composites. Although the single-charge processing concept is beneficial for improving the efficacy of the molding process and the structural homogeneity of the moldings, it certainly suffers from inherently aggravating the fulfillment of crucial processing goals such as: (i) the execution of the adhesion of the non-foamable thermoplastic resin to the internal surface of the mold that should always take place prior to the thermal activation of the foaming resin (thereby avoiding skin protrusions), and (ii) obtaining a solid skin layer with a uniform thickness. In this context, the fundamental research of the lifespan of CBA-blown bubbles in non-pressurized non-isothermal polymer melts using hot-stage optical microscopy and digital imaging indicated that the lifespan of fine-celled bubbles is significantly shorter than the inherently lengthy heating portion of the rotational molding process, so that fine-celled bubbles seldom reach the solidification stage of the cycle, which implies that only coarser-celled bubbles live long enough to participate in the final cellular structure. One of the major progresses of this research includes the development of a two-step oven temperature profile that prevents the foamable resins invading the solid skin layer and ensures that skin formation always completes prior to the activation of the foamable resin. It was based on the fundamental study of the adherence behavior of powders and foamable pellets to a high-temperature rotating mold wall and a fundamental study of the rotofoamablility of polymeric resins using both dry blending and melt compounding based methods including the characterization of their respective rheological and thermal properties. This study clarified why in rotationally foam molded cellular structures based on the use of a CBA, a fine-celled morphology has been closely approached, but it has not been actually achieved yet. Thus, it was clearly indicated that it would be very difficult to generate the preferred kind of bubbles (fine-celled) in rotational foam molding unless the duration of the heating portion of the process is dramatically reduced, or else. This created an importunate need for overcoming the fundamental disadvantage of the rotational molding process which is its very lengthy processing cycle time in comparison with respective currently implemented technologies. Embodiments of the present invention suggest a solution to this fundamental problem.

In comparison with the relatively large volume of research studies associated with conventional rotomolding, not much work related to the rotational foam molding process has been published to date in the open literature. Particularly, very limited research has been conducted on the processing of integral-skin cellular polymeric composites in rotational foam molding, while even a smaller body of literature deals with the study of the single-charge rotational foam molding technology. Furthermore, while several authors have done an admirable job in studying the formation and removal of unwanted bubbles in conventional rotational molding, other than a few recent studies, no substantial work has been performed yet to explain the mechanisms governing the CBA-blown production and retention of controlled size bubbles and their lifespan in non-pressurized non-isothermal polymer melts, such as in rotational foam molding. Likewise, compared to PE foams, very little research has been accomplished to date on the production of PP foams in rotational foam molding. Unlike PE, successful processing of PP foams in extrusion melt compounding-based rotational foam molding, as well as the production of integral-skin PP foams encapsulated with PE skins, have been reported only recently.

The surveyed patent literature indicates that for the manufacture of integral-skin cellular polymeric composites using the single-charge rotational foam molding technology, it would be essential to charge the mold with predetermined quantities of non-foamable and foamable resins having a significant particle size difference. The non-foamable particles intended for forming the skin should be introduced into the mold in a powder form, whereas the foamable particles intended for forming the foamed core should be first extrusion melt-compounded with an adequate quantity of CBA and then introduced into the mold in a pellet form. The powder particles would sinter earlier than the pellets because of their greater total contact area and because their smaller size would allow them to migrate towards the internal surface of the rotating heated mold where the temperature is the highest. Thereby, the powder will preferably fuse and form the skin layer before the uninterrupted heating of the mold initiates pellet sintering and subsequently trigger the decomposition of the CBA particles dispersed within the foamable pellets to form the foamed core. This concept may be effectively improved by selecting non-foamable resins that have a lower melting point, density, and viscosity, and/or heat capacity than the respective properties pertaining to the foamable resins. In addition, the non-foamable skin-forming resin should preferably comprise a low and a high zero shear viscosity components. Yet, the mold could be charged with a blend of non-foamable and foamable powders (e.g., reground compounded pellets of a polymer with a CBA) of polymers that have significantly dissimilar melting points and/or significantly dissimilar particle sizes. Also, a more intensive mold rotation during the formation of the skin and an optimized oven temperature profile would be helpful in preventing the premature adherence of the foamable pellets on the skin.

Previously conducted related research work indicated evidence of a strong causality between the duration of the heating cycle and the morphology of the obtained polymeric foams produced in rotational molding. These studies implicitly indicated that the morphologies of these cellular structures might be dramatically improved if successfully inventing a processing strategy that will utilize synergistically and concurrently the advantages of both the melt extrusion and rotational foam molding technologies. The purpose of the embodiments of this invention is to deliberately combine these two technologies: (i) to develop a technology that would be capable of achieving fine cell density in rotationally molded integral skin foams in a much wider processing/materials/system window through increased process controllability in comparison with the currently achievable and (ii) to reduce the duration of the processing cycle to thereby increase the efficacy and utility of the process to levels not conceivable with the prior art.

An embodiment of invention herein exploits the synergistic effects resulting from the deliberate conjunction of extrusion melt compounding and rotational molding through the development of an innovative extrusion-assisted technology for the "rapid" manufacture of lightweight integral-skin fine-celled rotationally molded foamed articles having unique physical and mechanical properties and strength to weight ratios. An embodiment of the invention includes the design and development of an extrusion-assisted heavy-duty rotational foam molding experimental apparatus that was utilized to facilitate the understanding of this novel process and the experimental work intended to validate the extrusion-assisted rapid fabrication technology for lightweight integral-skin fine-celled rotationally molded foams as well as to determine the feasibility of successfully developing microcellular rotationally molded foams.

SUMMARY OF THE INVENTION

The embodiments of present invention relates to a molding process including the steps of: precharging a mold with a predetermine amount of non-foamable plastic powder; rotating and heating the mold in an oven until, the plastic powder melts and coats the inside of the mold thereby producing a solid skin; removing the mold from the oven; injecting extruded plastic foam into the mold and rotating the mold; and cooling the mold to produce a foamed product with an outer skin.

In another aspect of an embodiment of the invention there is provided a molding process including in the steps of: precharging a mold with a predetermine amount of non-foamable plastic powder; rotating and heating the mold in an oven until the plastic powder melts and coats the inside of the mold thereby producing a solid skin; removing the mold from the oven; injecting foamable extrudate including a heat activated blowing agent into the mold and rotating the mold; reinserting the mold into the oven in order to induce decomposition of the heat activated blowing agent contained in the extrudate and produce a foamed layer inside the solid skin; and cooling the mold to produce a foamed product with an outer skin.

In further aspect an embodiment of the invention is directed to a molding apparatus including a mold, an arm, an extruder and an oven. The mold has an interface device. The arm is adapted to rotate the mold. The extruder is operably connected to the interface device of the mold. The oven is adapted to heat the mold.

Further features of embodiments of the invention will be described or will become apparent in the course of the following detailed description.

BRIEF DESCRIPTION OF THE DRAWINGS

The invention will now be described by way of example only, with reference to the accompanying drawings, in which.

DETAILED DESCRIPTION OF THE INVENTION AND PREFERRED EMBODIMENTS

The basic rationale of the embodiments of the present invention is that it would be desirable to decouple the heating segment of the rotational molding process by using a much more efficient plastic fabrication method such as, for example, extrusion. Extrusion is a fundamental shaping and compounding process for polymers.

Figure 1:
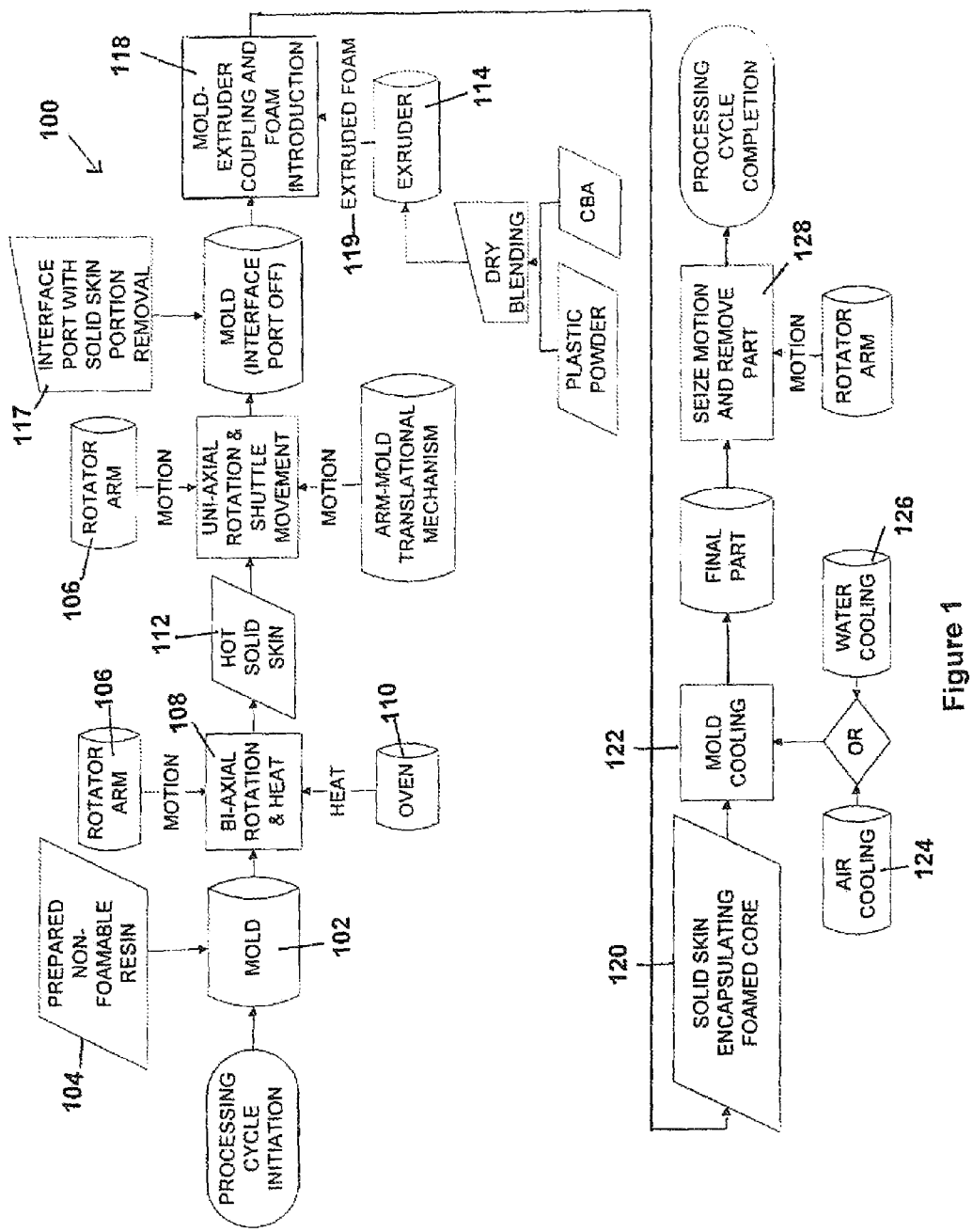
FIG. 1 is a flow chart of the rapid rotational molding process of the present invention.

The flow of the process for extrusion-assisted uni-axial and biaxial rotational molding is shown generally at 100 in FIG. 1. The process can be explained in the following steps:

First the mold 102 is opened and the non-foamable plastic resin 104 is added.

The mold 102 is resealed and the rotational arm 106 begins to rotate bi-axially 108.

The rotating arm is moved into the oven 110 and sealed. Using the proper heating rates and temperature profile the non-foamable plastic is melted. Once melted, the polymer is evenly distributed about the mold because of the motion induced. The skin 112 has, as a result, been created.

The mold, while still spinning, is removed from the oven and the rotation about the main axis comes to a halt. Meanwhile, the extruder 114 has begun to compound the foamable plastic resin. While the mold spins uni-axially 116 the extruder is aligned. The insulated interface port is removed from the mold together with a portion of the lust formed soft skin 117 and leaves an opening on the mold and the extruder nozzle is opened. At a set elevated temperature the CBA or other heat activated blowing agent contained in the foamable resin 119 decomposes and thereby releases gas that creates a cellular structure at the exit of the extruder nozzle when exposed to thermodynamic instability by replacing the high-pressure environment within the extruder barrel with the atmospheric pressure at the exit of the extruder nozzle. Next, the nozzle of the extruder protrudes through the opening on the mold and reaches the interior of the plastic part. The foamed plastic is allowed into the cavity 118.

After a predetermined amount of foam is charged into the mold, the quantity of which depends on the desired volume expansion ratio of the foam, the nozzle is removed from the mold and closed, thereby stopping the flow of plastic foam, whereas the skin at the mold gate is subsequently self-sealed by the function of the insulated interface port which is returned in place. The formation of the foam is allowed to propagate to completion while the mold is again rotated biaxially. The integral-skin foam polymer part takes shape 120.

The mold is then cooled 122 by means of air 124 or water 126. After a sufficient amount of cooling time the rotation is concluded and the plastic part is removed from the mold 128.

Figure 2:
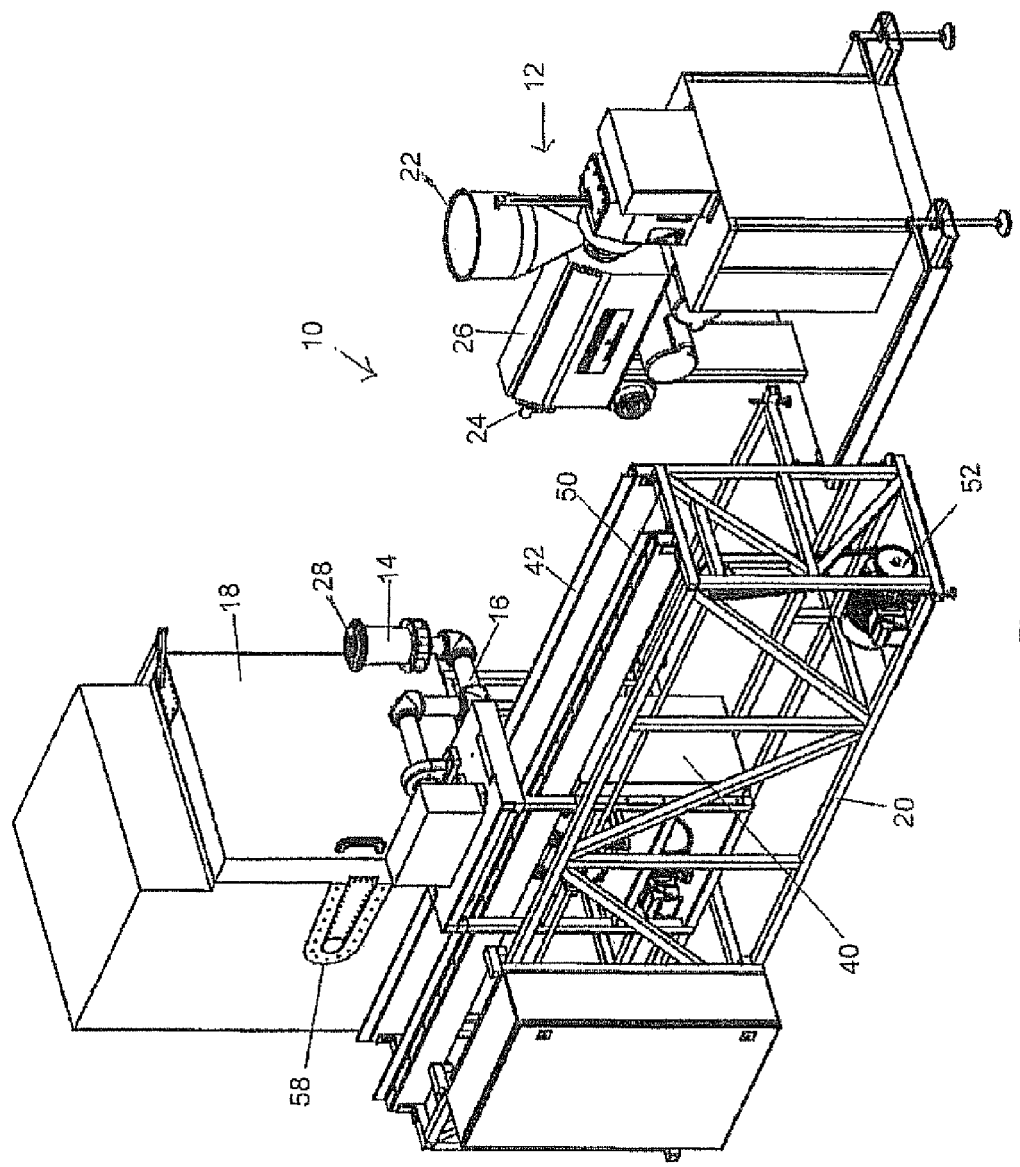
FIG. 2 is a schematic isometric view of the rapid rotational molding apparatus.

Referring to FIG. 2, the main components of the extrusion assisted rotational foam molding system of an embodiment of the present invention as shown generally at 10 include an extruder 12, a mold 14, a rotator arm 16 and an oven 18. The mold moves between the oven and the extruder. It will be appreciated by those skilled in the art that these components may be arranged such that the oven is in a fixed position while the mold and the extruder are moveable. Alternatively the rotator arm and the mold are fixed and the extruder and the oven are moveable. In the preferred embodiment the oven and the extruder are fixed and the rotator arm and the mold move therebetween by way of an arm carriage and translational mechanism 20.

The extruder 12 includes a barrel and screw or screws. Polymer pellets or powder are gravity fed 22 into the barrel at one end and are forced through the barrel by the screw or screws and out the nozzle 24. Electric or oil heating elements 26 are placed along the barrel to soften the feed, distribute the heat, and maintain the fluidity of the polymer. As the material is conveyed through the barrel by the screw, the screw processes the plastic in three separate ways. First, the screw moves the resin from the hopper into the sealed section, called the feed section, of the barrel and begins to heat the polymer.

In the compression section the polymer is transformed into a liquid consistency while the air trapped between the pellets is vented. Finally, in the metering section the polymer melt is homogenized and sufficient pressure is developed to force the plastic extrudate through the nozzle 24. If the extruder has been fed by a dry-blended mixture of polymer powders and chemical blowing agent or agents because of the action of the screw or screws within the extruder barrel, compounding will take place as a result of which the particles of the CBA will be uniformly distributed within the molten polymer matrix thereby creating a foamable extrudate to be pushed through the die which immediately starts to foam at the exit of the extruder nozzle.

As presented above, the purpose of an embodiment of this invention is to fully utilize the synergistic effects of the extrusion and rotational molding technologies so that an industrially viable, cost-effective technology for manufacture of fine-celled integral-skin rotomolded polymeric articles with superior properties is developed. The fundamental principle of this novel processing concept involves two basic segments. In the first step, a separable metal mold 14, pre-charged with a predetermined amount of non-foamable plastic powder, will be simultaneously rotated bi-axially and subjected to external heating until its plastic content melts and coats the internal mold's surface without pressure or centrifugal force, thereby creating a skin that duplicates accurately the shape of the mold. The process differs from the current practice, which requires the foamable resin to be produced in a remote extrusion-based melt compounding operation involving a carrier resin and a chemical blowing agent to produce decomposition-free foamable solidified pellets.

In the latter segment, non-chilled polymeric foam is directly "injected" into the uni-axially rotating mold 14 via a specially designed port 28, subsequent to which it will be externally cooled to solidify the product. This embodiment establishes the basis for a successful "marriage" of the extrusion and rotational foam molding technologies. Deliberate efforts to explore and employ the synergistic effects arising from combining the melt extrusion and rotational molding have been made in the framework of this embodiment. The implementation of this process will significantly reduce the time needed for melting the foaming resins because as the polymer is advancing forward along the extrusion barrel, it is exposed to friction-induced heating due to the revolving action of the plasticizing screw or screws, as a result of which it melts.

The overall processing time is dramatically reduced due to the fact that the foamable material is heated only once and by using the most efficient process available for melting plastics, i.e., extrusion.

This advanced processing approach not only dramatically reduces the consumption of energy and processing time, but also it simultaneously provides improved means for cell growth control and timely and unobstructed skin formation, thereby improving the structural homogeneity of the moldings.

The rapid rotational foam molding process disclosed herein overcomes the current barriers to the production of fine-celled rotationally molded foams, as well as the current relatively narrow processing window and the high energy costs will be substantially relaxed with the implementation of the presently proposed technological innovation. In addition, because of the superior properties of fine-celled foams, the performance of the respective fine-celled rotationally foam molded integral-skin foam products improves significantly while dramatically decreasing the processing costs in comparison with conventionally manufactured equivalents.

Following, the main components of the extrusion assisted rotational foam molding system 10 will be described in more detail.

Preferably extruder 12 is capable of melt compounding CBAs with thermoplastic resins. Extruder 12 has a heated nozzle 30 that allows sealing its tip when not injecting the melt into the mold; this is to prevent the leakage of the processed foam at stages of the process when the extruder is not in use. The extruder has an adjustable barrel temperature and screw RPM.

In one embodiment the extruder 12 is a 32 [mm] screw diameter with a compression ratio of 24:1. The extruder's drive system is equipped with a 7.5 HP motor with a torque delivery accuracy of ±1% and a maximum screw RPM value of 100. Preferably the extruder 12 includes a melt blending system to aid in the dispersion the CBA particles within the foamable resin. The bi-metallic lined barrel of the extruder contains seven temperature control zones. Three zones are in the barrel, one is in the melt blending system, one is in the adaptor, and two are in the die.

Figure 4:
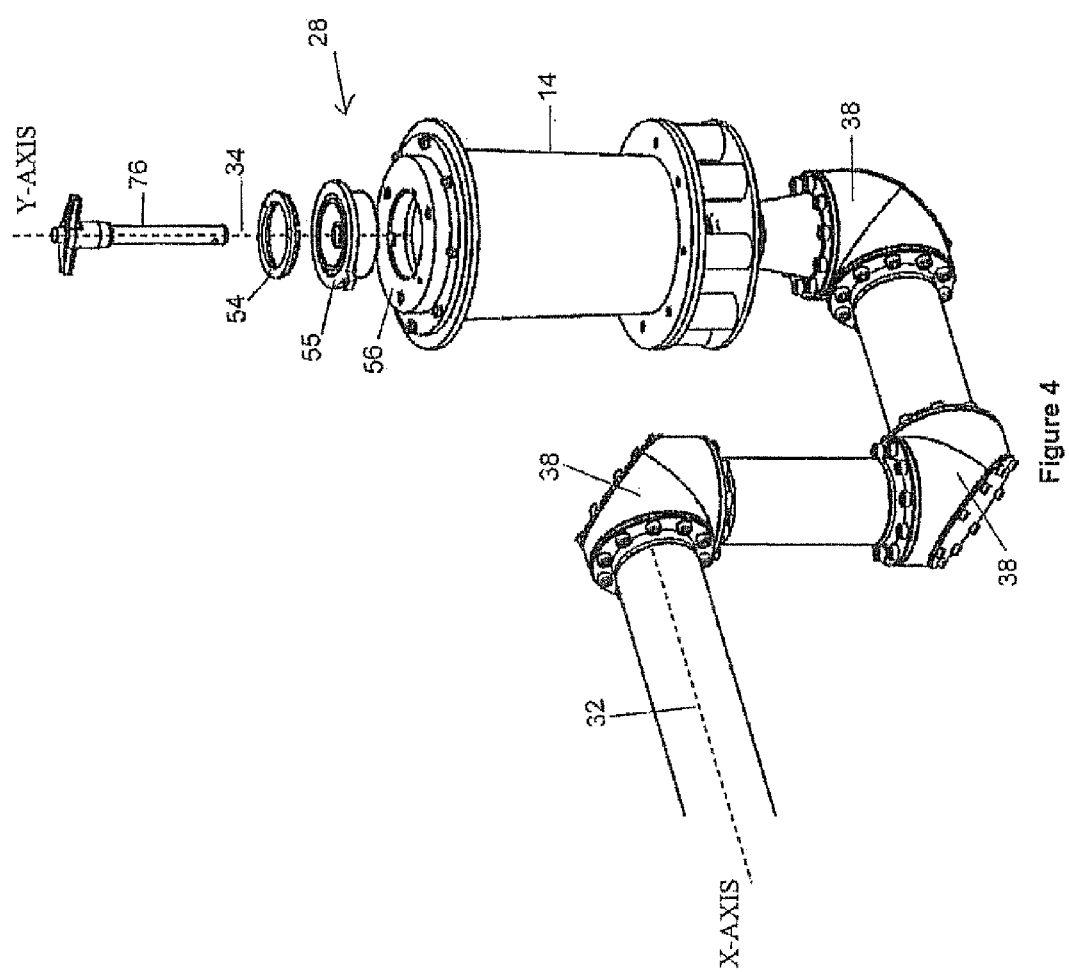
FIG. 4 is a schematic isometric exploded view of the insulated interface assembly.
Figure 5:
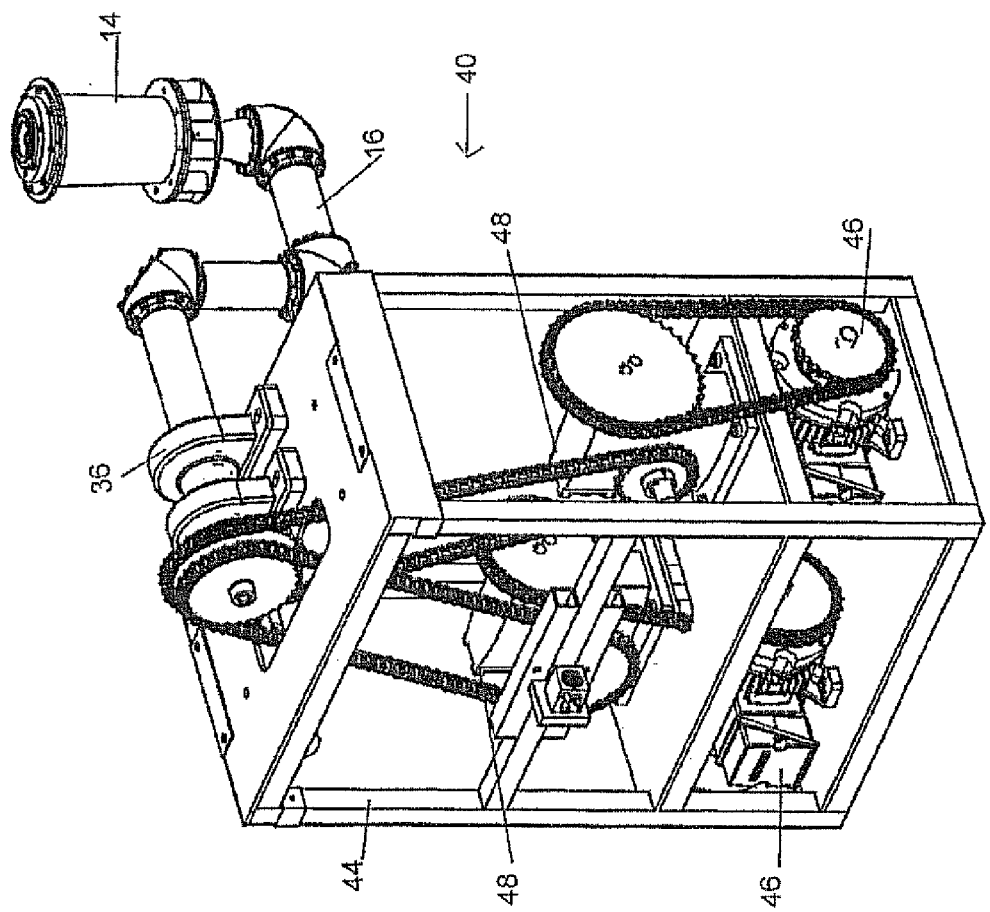
FIG. 5 is a schematic isometric view of the carriage assembly and the bi-axially rotating arm with the mold assembly.

The rotary arm 16 as best seen in FIGS. 4 and 5 is capable of rotating the mold 14 both uni-axially and bi-axially in a manner such that one rotation is about the central axis of the mold and the other rotation is about an axis perpendicular to the central axis. The RPMs of both the arm and mold rotation are controllable. Also, the arm components are capable of withstanding the high temperatures of the oven 18 and fit within the oven boundaries during the mold heating process.

The arm 16 rotates the mold 14 in two perpendicular axes; for ease of discussion these are referred to as the x-axis 32 and the y-axis 34. Rotation about the x-axis is achieved by connecting the external arm shaft at its base to the drive system using a chain and sprocket setup 36 as best seen in FIG. 5. Rotation about the y-axis is achieved by transmitting power to the mold mount, using a different drive system, by means of three pairs of miter bevel gears 38 situated at the corners of an internal shaft assembly (which is contained within the external arm body). The internal shaft assembly is concentric with the arm body along its length.

The arm 16 is able to translate back and forth between the extruder 12 and the oven 18 while rotating at different regimes during the processing cycle. A linear translation mechanism 20 includes a cart 40 fixed on a track 42 as best seen in FIG. 2, as best seen in FIG. 5. The cart 40 has a frame 44 embracing the rotator arm and its drive system, which contains two motors 46, two gear reduction boxes 48, and eight sprockets with chains connecting them for power transmission. The track consists of a chain 50 driven by a motor 52 as shown in FIG. 2. The fixed connection between the cart and track allows the cart to translate when the track is driven by the motor mounted to the main frame.

The mold 14 is designed so that it is attachable to the rotational drive system on one end and temporarily attachable to the extruder output nozzle at the other end while rotating uni-axially. A specially designed interface or port 28 allows the injection of the foamable extrudate without damaging the already formed solid skin. A vent (not shown) is provided to avoid pressure buildup in the mold during the process. The mold 14 is designed for ease of part removal once the processing sequence is completed. The material for the mold should be chosen so as to maximize heat transfer and minimize corrosion with the intention that the integrity of the surface finish of the molded part remains over extended period of use.

Figure 6:
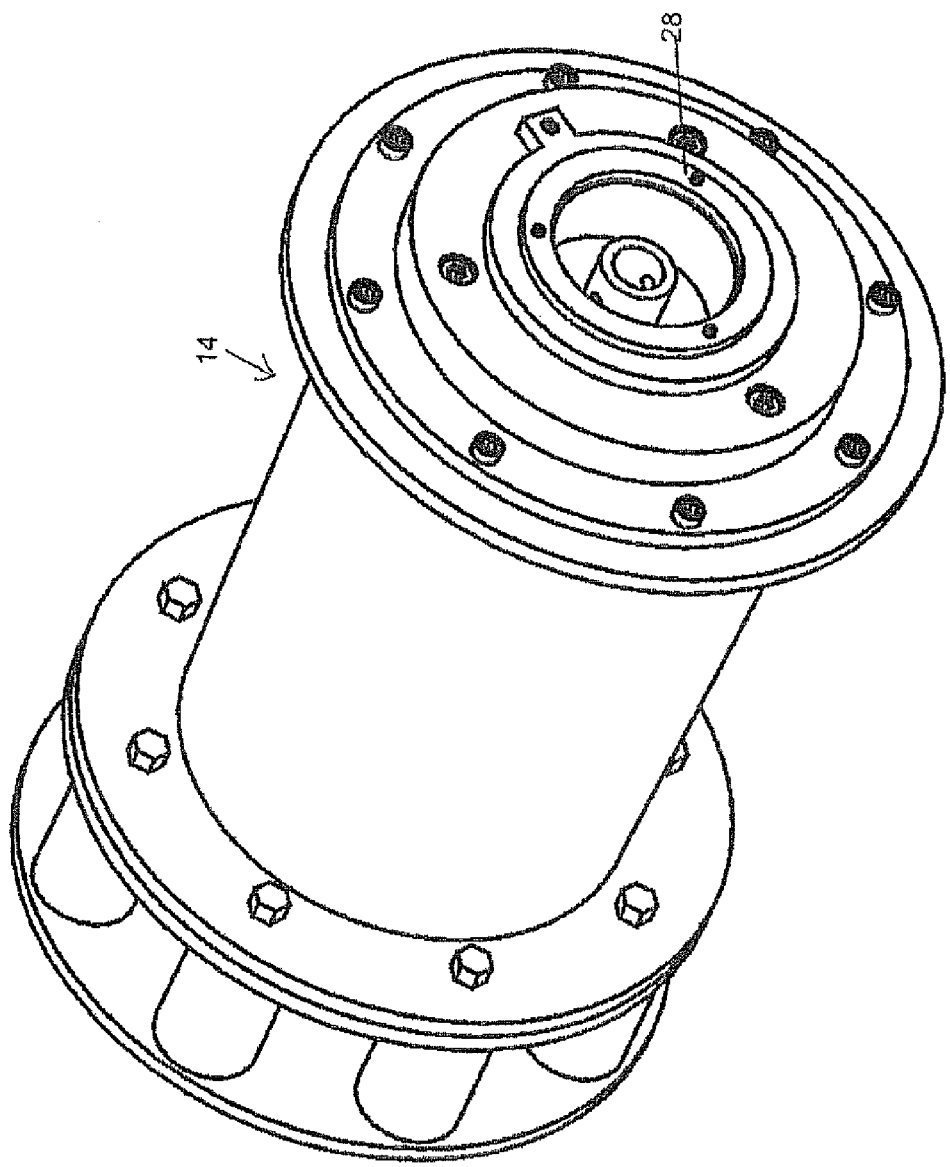
FIG. 6 is a schematic isometric view of the cylindrical mold.
Figure 7:
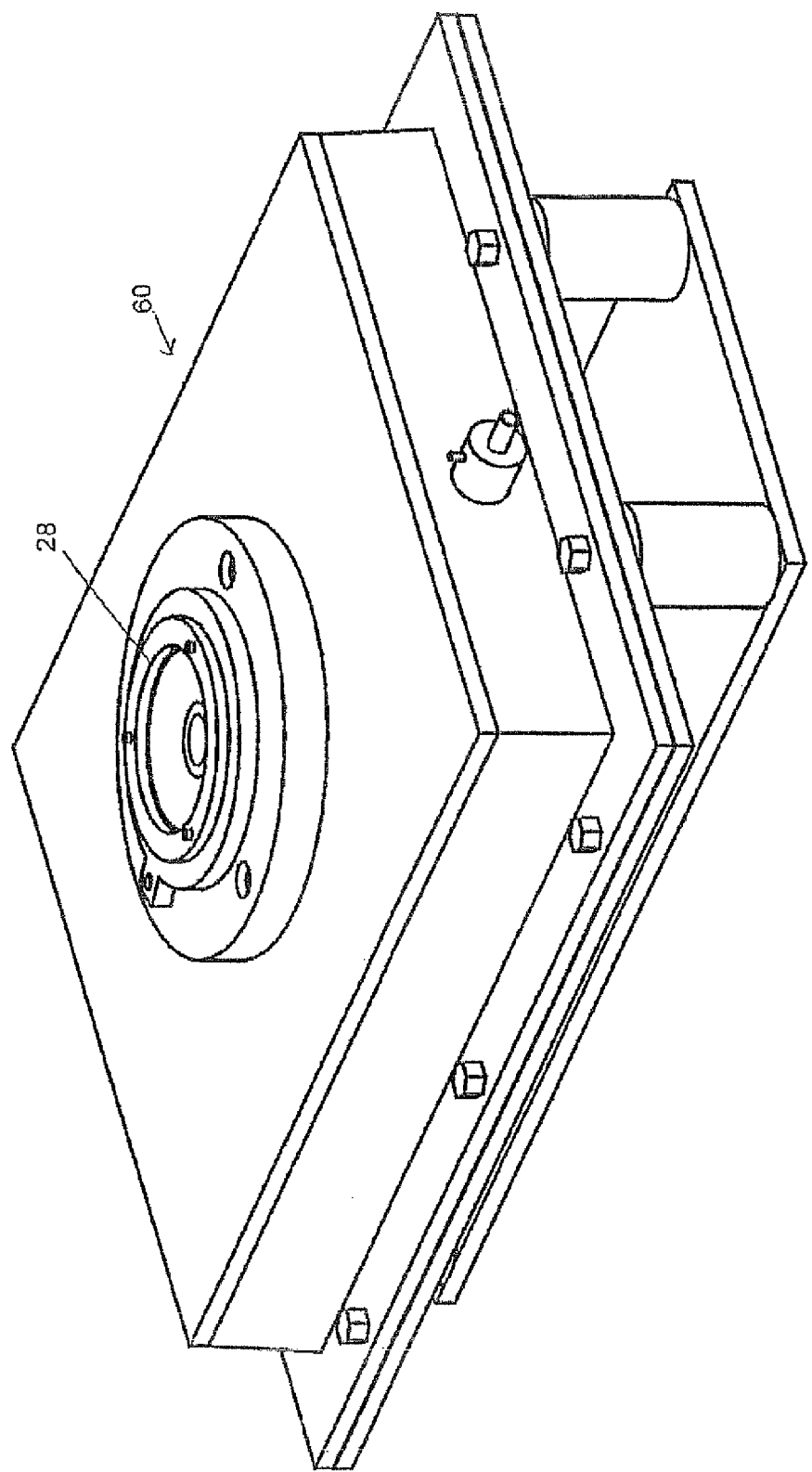
FIG. 7 is a schematic isometric view of the flat-plate mold.
Figure 8:
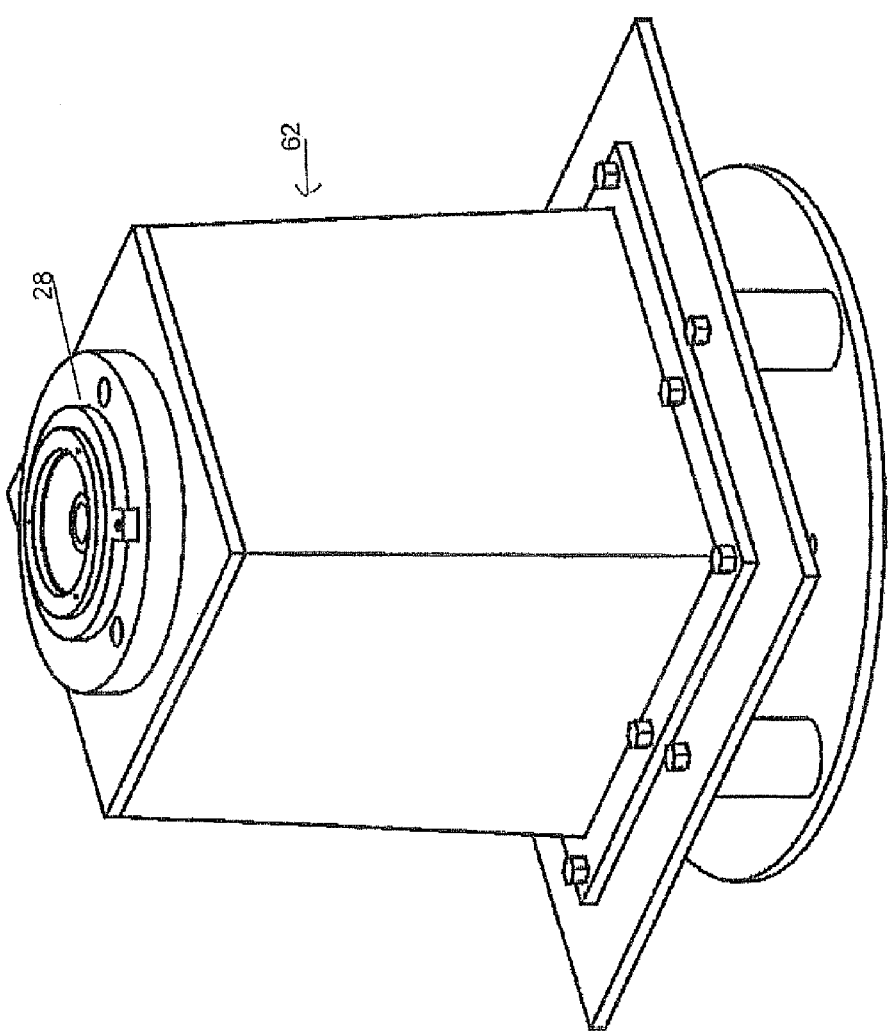
FIG. 8 is a schematic isometric view of the box mold.

In one embodiment the mold shape 14 is cylindrical (FIG. 6) and has 2° draft angle for easy part removal. Also, in order to assemble the mold to the rotator arm 16 and to support the insulated interface or port 28, two flanges with bolt holes were welded to the ends of the tapered cylinder. One end of the mold 14 contains a venting tube to avoid pressure buildup during the process. The selected material for the mold was Aluminum 2014 featuring a thermal conductivity value of 192 [W/m−K], which will maximize the heat transfer into and out of the mold. In the second and third embodiments the molds were shaped as a flat-plate 60 (FIG. 7) and a box 62 (FIG. 8). Both 60 and 62 share the same features as the first embodiment described previously in addition to supplementary venting tubes to accommodate for the difference in shape during filling.

Figure 9:
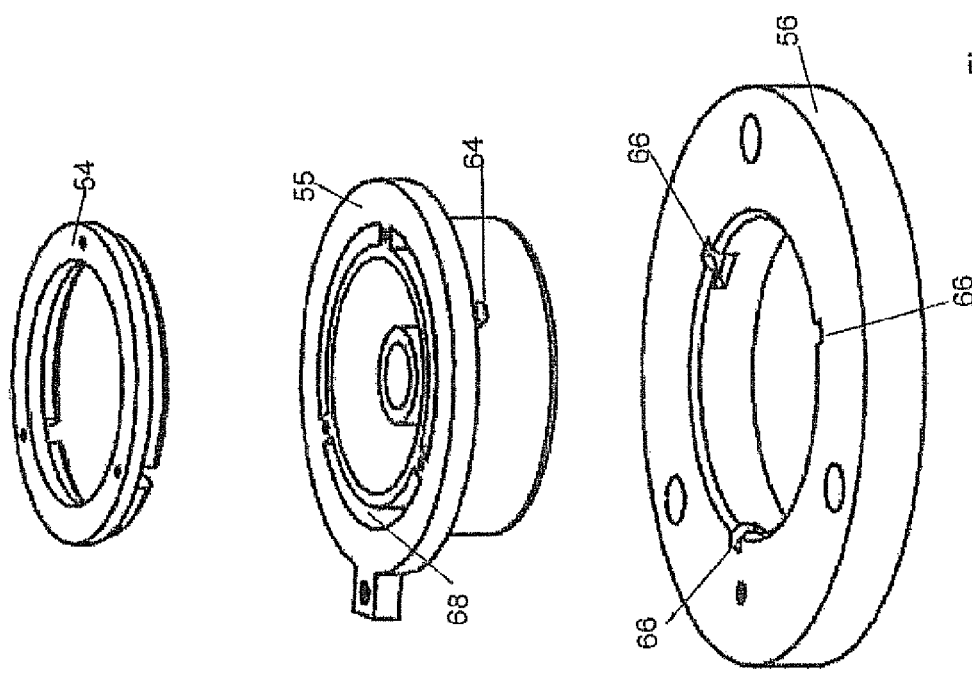
FIG. 9 is an enlarged schematic isometric view of the interface port shown in FIG. 4.

During the extrudate injection phase, the output nozzle 30 on the extruder enters the mold 14, and injects the extrudate. For sealing the mold immediately after the extrudate injection a specially designed insulated interface port 28 was created for this purpose and is shown in FIGS. 4 and 9. Due to the insulated interface port, the mold 14 will be initially sealed, then open to receive the nozzle 30, and finally put back into place upon the retraction of the nozzle, while sealing any voids by the solidified plastic.

The mold interface or port 28 assembly consists of three components: insulation cap 54, mold interface 55 and mold connection adaptor 56 as best seen in FIG. 9. The mold connection adaptor 56 is secured to the mold via three screws (not shown) and holds the mold interface in place during operation. The mold interface 55 is locked into place by placing it into the adaptor while aligning the three studs 64 on the outside of the interface in-line with the three channels 66 located on the adaptor 56, and turning it counter-clockwise. Once in place, a small screw (not shown) on the interface is secured to the adaptor 56 to prevent further unwanted movement during the bi-axial rotation of the mold. Inside the interface 55 there exists a channel 68 with a 2 mm wall thickness between the outside of the interface that comes in contact with the integral-skin polymer and the inside of this channel. The purpose of this channel is to drastically reduce the heat transfer ability of the interface by filling it with a high temperature insulation that is kept in place by the insulation cap 54.

Figure 10:
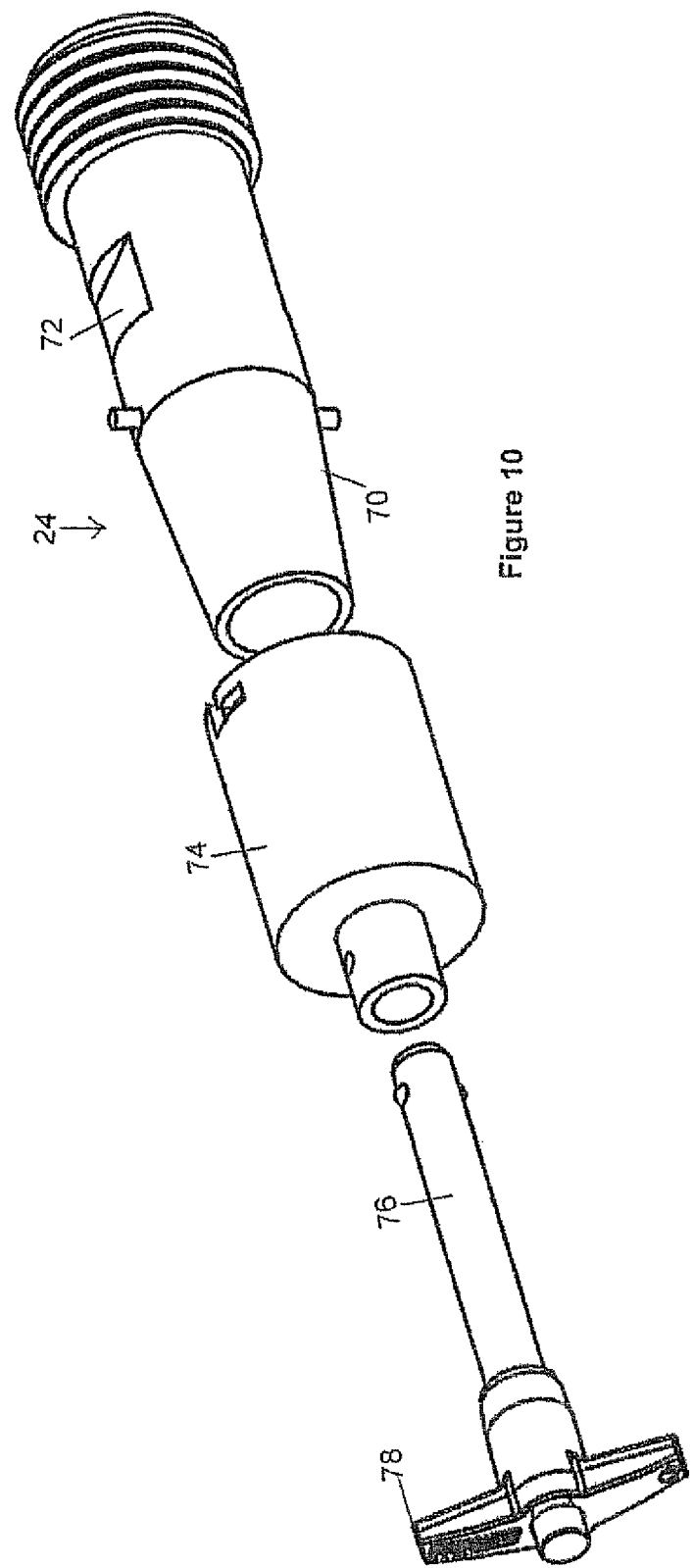
FIG. 10 is an enlarged schematic isometric view of the nozzle shown in FIG. 2.

In this embodiment the material exiting the extruder is in the form of foam, nozzle 24 was designed to attach directly to the extruder 12 to reduce the number of heating zones and the complexity of the extruder operation. Referring to FIG. 10, the nozzle 24 features a conical shaped end portion 70 adapted to aid in the alignment of the tip into the mold interface or port 28. On two sides in the mid section of the nozzle there are flat sections 72 to accommodate for tightening of the nozzle to the extruder via a screw connection to the connection flange of the extruder. When not attached to the mold 14, the nozzle 24 may be equipped with a heated enclosure 74 to maintain the nozzle's elevated temperature and to contain any gases released from the CBA before filling. This nozzle assembly also features a quick release t-handle 76 to remove the nozzle enclosure 74.

Quick release t-handle 76 is preferably a commercially available handle features an easy to grasp t-shaped grip 78 and a convenient push button release to unlock it from either the mold interface 28 or the nozzle enclosure or hood 74. The handle is locked in place by a spring actuated dual ball locking assembly at the base of the handle. Additionally the length of the handle was chosen to keep the operator at a safe distance from the hot equipment.

Preferably the oven 18 exhibits proportional-integral derivative feedback control (PID) with a simple user interface to program the desired temperature profiles. Preferably the opening of the oven door is possible both manually and in automatic mode in order to allow the entrance and exit of the rotating arm with the mold in a semi or fully automated manner.

In one embodiment a forced convection oven was used to provide temperature stability to the processing environment. The oven's internal dimensions are: 635×635×635 [mm]. Its maximum operating temperature and heating rate are 300 [° C.] and 15 [° C./min], respectively, with a temperature uniformity of ±0.5 [° C.]. The purchased oven was customized to accommodate the bi-axially rotating arm during the mold heating phase with minimal heat loss. This was achieved by employing two measures. First, a slot 58 (shown in FIG. 2) was created on one side of the oven to allow the smooth translation of the arm 16 into and out of the oven 18. The slot 58 was designed with tight tolerance in order to minimize the heat escape that can result when the oven and arm interaction takes place. Preferably the oven 18 is placed on a frame with an adjustable height; this frame provides flexibility when aligning the mold, extruder, and oven on the same operating axis.

Unlike the prior art, the embodiments of the present invention relate to a molding process which is based on intentionally decoupling the traditional rotational molding process of a hollow article (the solid skin) from the creation of an internal solid skin-surrounded foamed core or layer. This advantageously resulted in devising a less time consuming and less energy intensive technologically-distinctive advanced approach to the processing of polymers into rotationally molded cellular polymeric composites of controllable densities and with significantly improved mechanical properties compared to conventionally-processed respective analogs. The experimental results confirmed the feasibility of the rapid rotational foam molding concept for fabricating integral-skin fine-celled cellular polymeric composites. Simultaneously, the duration of the processing cycle time and the energy consumption were reduced to levels not conceivable with the prior art without compromising product quality.

Figure 3:
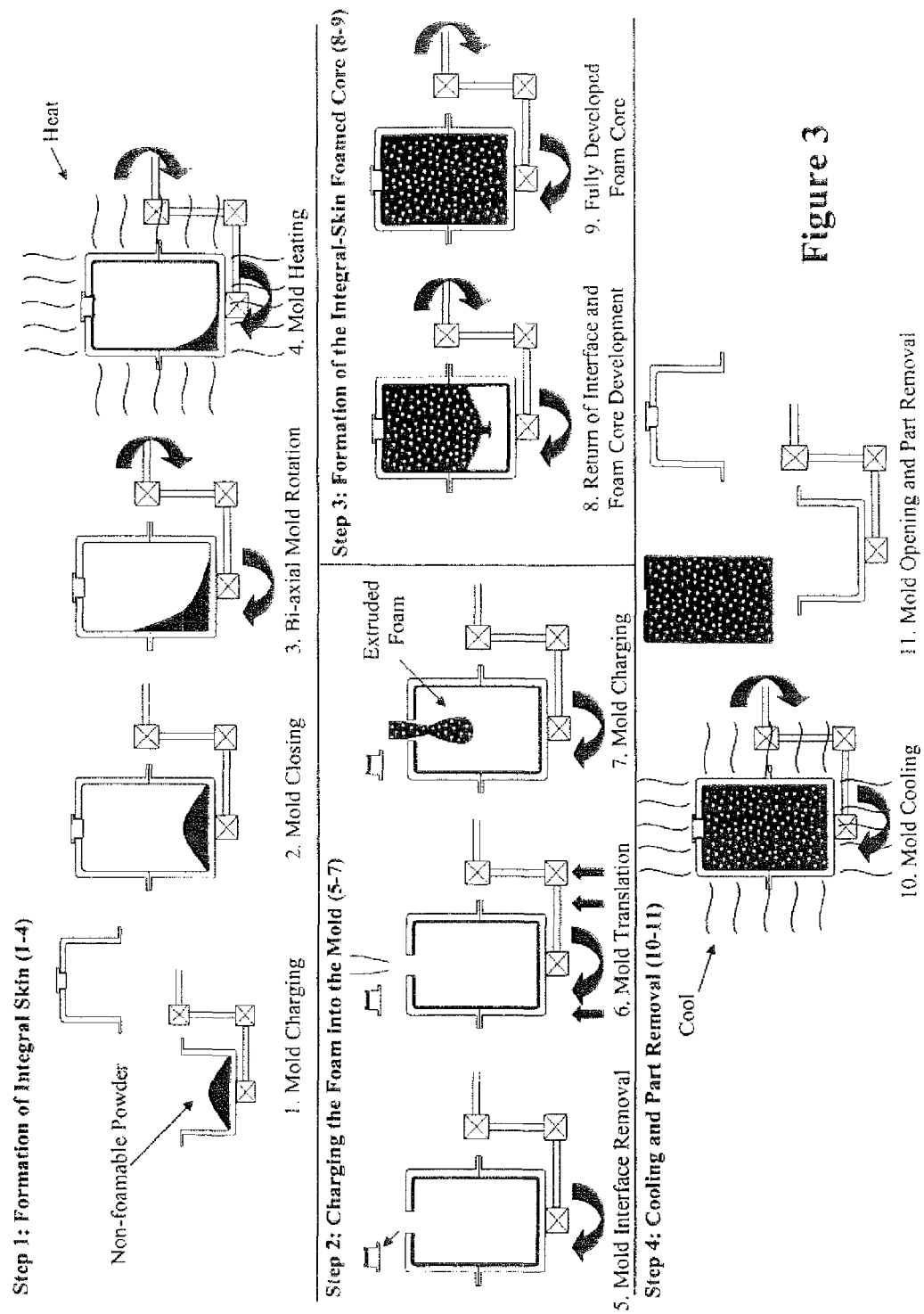
FIG. 3 is a detailed visual description of the rapid rotational foam molding process steps.

The Rapid Rotational Foam Molding processing concept can be summarized in 4 unique steps as pictured in FIG. 3.

Step 1: At the inception of the process, the mold is manually charged with a predetermined amount of non-foamable plastic resin in powder form, which will be used to create the molded part's solid skin.

Step 2: The arm and the mold assembly are inserted into the oven by means of a carriage and translational mechanism. The mold rotates in a biaxial manner within the oven, utilizing the arm. The mold is being rotated and heated until the plastic powder melts and coats the inside of the mold thereby producing a solid skin. This step is accomplished at a material-dependent elevated temperature for an accordingly set period of time to accomplish the creation of the skin. Simultaneously, the extruder is charged with predetermined amounts of dry blended polymer resin with a heat activated chemical blowing agent, suitable for achieving polymeric foam that exhibits a desired volume expansion ratio (VER) at a set melt temperature.

Step 3: The arm and mold assembly are then removed from the oven and translated towards the extruder, with the arm rotation switched to a uni-axial mode and the mold aligned with the extrusion port. The extruder subsequently fills the hot mold with extrudate comprised of the desired foam for a period of time dependent on the melt flow rate and extruder screw RPM. The filling process occurs at the mold-extruder interface gate which has been designed so as to seal the mold during the conventional rotational molding cycle, facilitate the introduction of foam to it during the foam filling stage, and allow the skin to self-heal after the filling process is accomplished thereby allowing the skin to settle back at its original location, undamaged, fully encapsulating the foamed layer or core with a solid skin.

Step 4: The mold is then bi-axially rotated and cooled. Subsequently, the solidified rotationally molded foamed product with an outer skin is removed from the mold.

Figure 11:
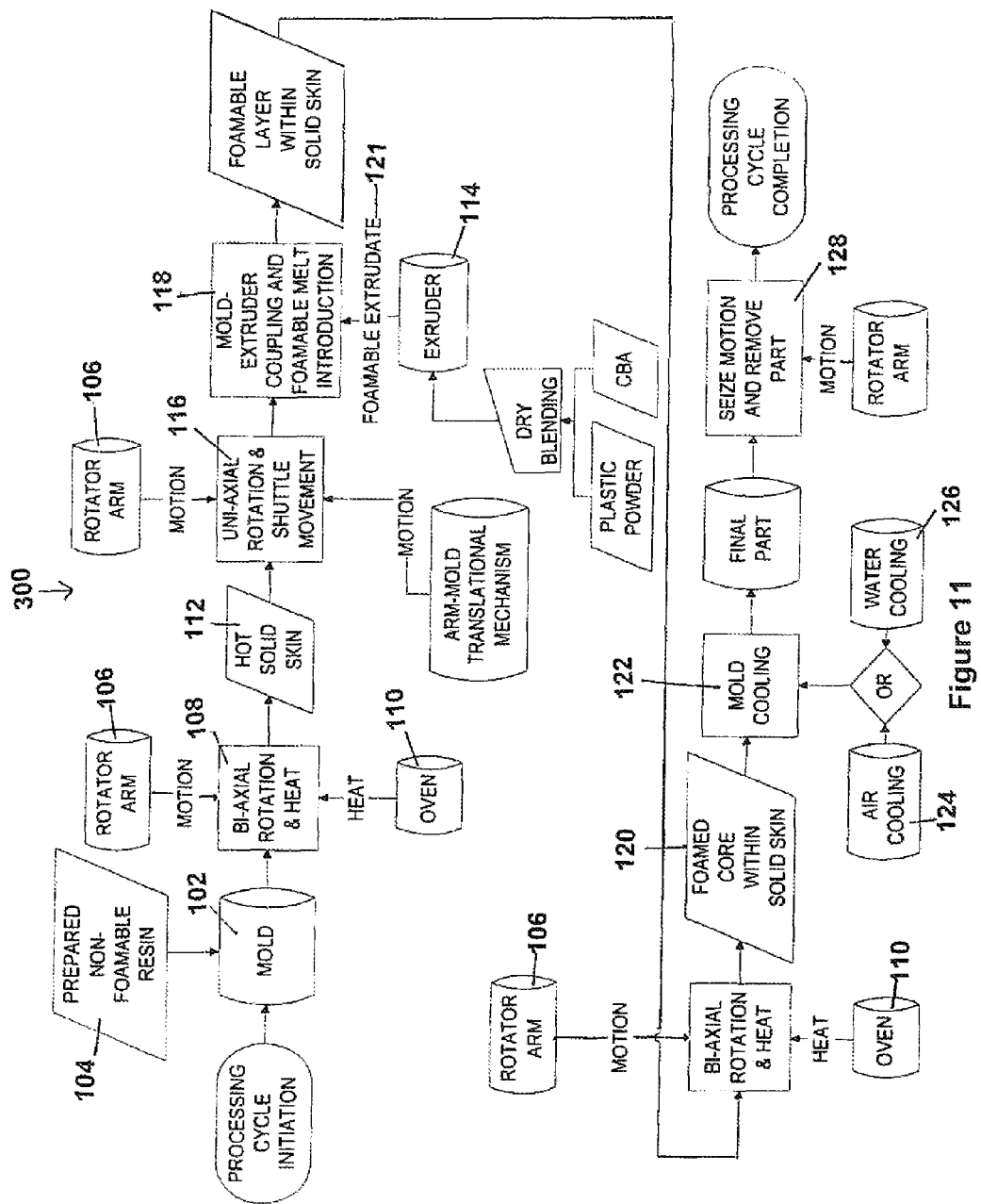
FIG. 11 a flow chart of an alternate embodiment of the extrusion assisted rotational molding process of the present invention.
Figure 12:
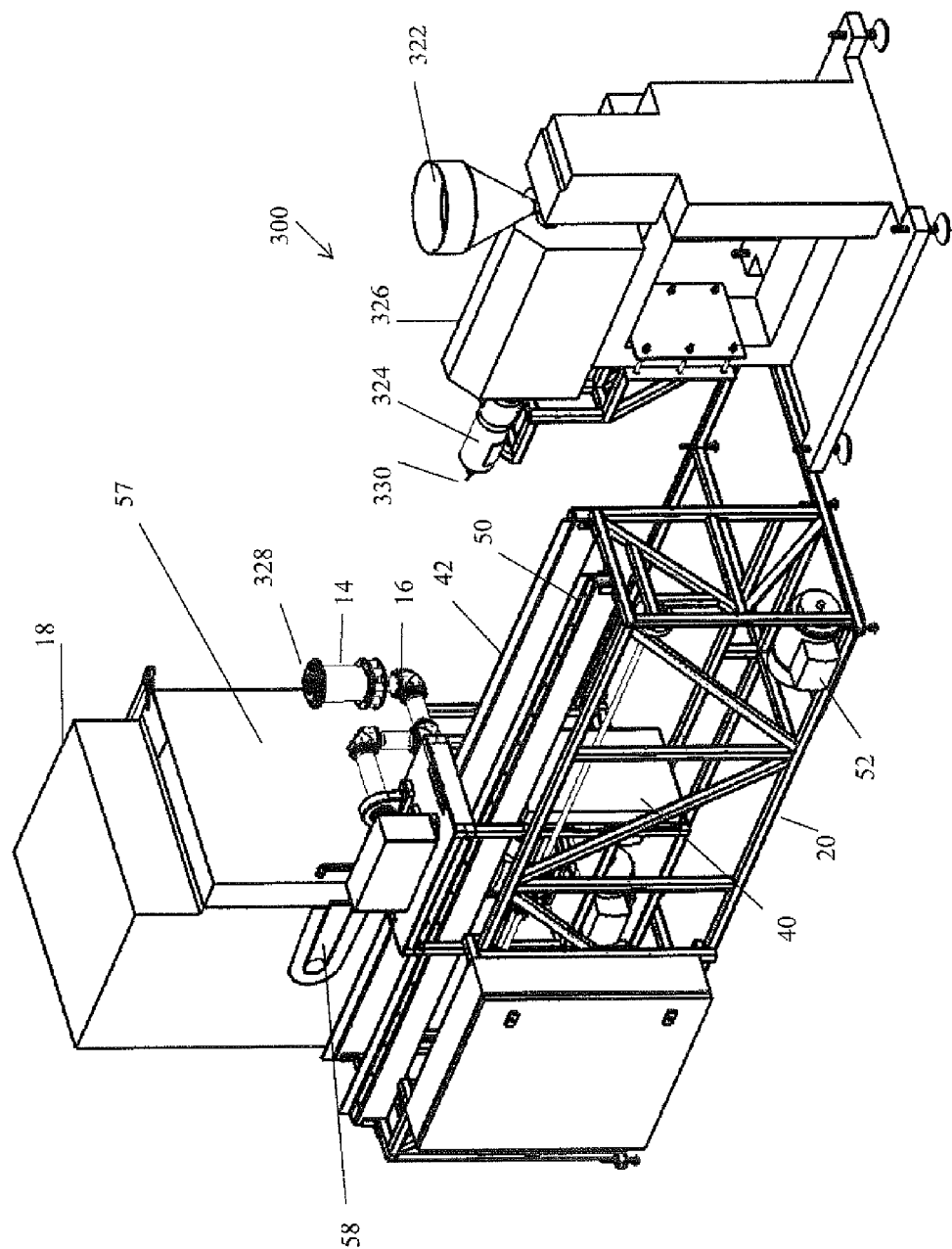
FIG. 12 is a schematic isometric view of an alternate embodiment of the extrusion assisted rotational molding apparatus.
Figure 13:
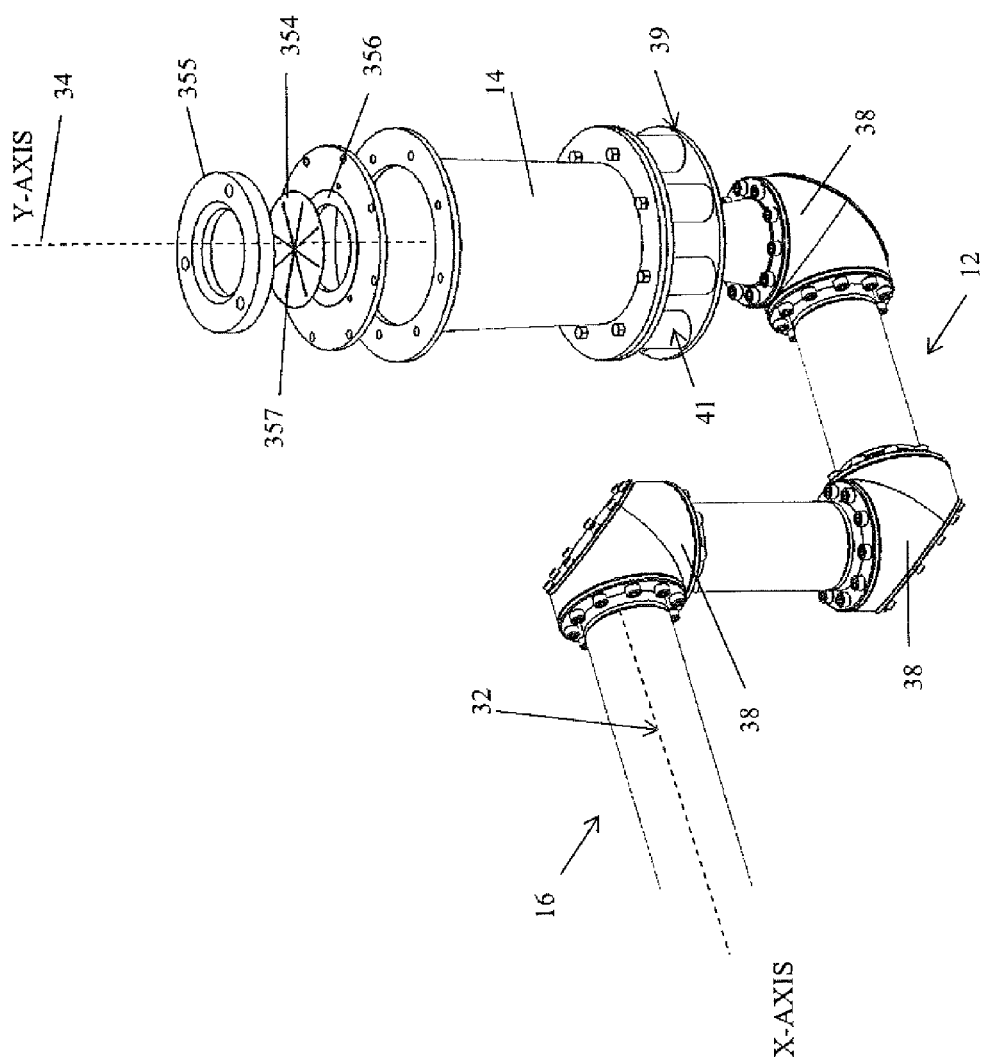
FIG. 13 is a schematic view of the bi-axially rotating arm with an exploded view of the mold assembly of the embodiment shown in FIG. 12.

An alternate embodiment of the present invention is shown generally in FIGS. 11 to 13. In this embodiment the flow of the process for extrusion-assisted rotational molding is shown generally at 200 in FIG. 11. The process can be explained in the following steps:

First the mold 102 is opened and the non-foamable plastic resin 104 is added.

The mold 102 is resealed and the rotational arm 106 begins to rotate bi-axially 108.

The rotating arm is moved into the oven 110 and sealed. Using the proper heating rates and temperature profile the non-foamable plastic is melted. Once melted, the polymer is evenly distributed about the mold because of the motion induced. The skin 112 has, as a result, been created.

The mold, while still spinning, is removed from the oven and the rotation about the main axis comes to a halt. Meanwhile, the extruder 114 has begun to melt the foamable plastic resin and store it in the chamber. While the mold spins uni-axially 116 the extruder is aligned. The nozzle of the extruder breaches the coupling valve and breaks the polymer skin of the mold to reach the interior of the part. The nozzle is opened and the foamable plastic 121 is allowed into the cavity 118.

After a predetermined amount of foamable extrudate is charged into the mold, the quantity of which depends on the desired volume expansion ratio of the foam, the nozzle is closed, stopping the flow of plastic, and removed from the mold, which is subsequently self-sealed by the function of the "pizza" valve.

The mold begins once again to rotate bi-axially while being reinserted into the oven 106. The temperature of the oven is again increased, however, this time the temperature is higher. At the elevated temperature the CBA or other heat activated blowing agent contained in the foamable resin decomposes and thereby releases gas that creates a cellular structure. This is the main difference between the process shown at 100 and described above and process 200. The nucleation of the gas is allowed to propagate to completion. The integral-skin foam polymer part takes shape 120.

The mold, still rotating, is removed from the oven to the neutral position, neither in the oven or coupled to the extruder. The mold is cooled 122 by means of air 124 or water 126. After a sufficient amount of cooling time the rotation is concluded and the molded part is removed from the mold 128.

Referring to FIG. 12, the main components of the extrusion assisted rotational foam molding system of an embodiment of the present invention as shown generally at 300 include an extruder 312, a mold 14, a rotator arm 16 and an oven 18. Only those components that are different from the molding system 10 described above with be described hereafter in regard to system 300.

The extruder 312 includes a barrel and screw or screws. Polymer pellets or powder are gravity fed 322 into the barrel at one end and are forced through the barrel by the screw or screws and out the die 324. Electric or oil heating elements 326 are placed along the barrel to soften the feed, distribute the heat, and maintain the fluidity of the polymer. As the material is conveyed through the barrel by the screw, the screw process the plastic in three separate ways. First, the screw moves the resin from the hopper into the sealed section, called the feed section, of the barrel and begins to heat the polymer. In the compression section the polymer is transformed into a liquid consistency while the air trapped between the pellets is vented. Finally, in the metering section the polymer melt is homogenized and sufficient pressure is developed to force the plastic extrudate through the die 324. If the extruder has been fed by a dry-blended mixture of polymer powders and chemical blowing agent or agents because of the action of the screw or screws within the extruder barrel, compounding will take place as a result of which the particles of the CBA will be uniformly distributed within the molten polymer matrix thereby creating a foamable extrudate to be pushed through the die 324.

The purpose of this embodiment is to fully utilize the synergistic effects of the extrusion and rotational molding technologies so that an industrially viable, cost-effective technology for manufacture of fine-celled integral-skin roto-molded polyolefin articles with superior properties is developed. The fundamental principle of this novel processing concept involves two basic segments. In the first step, a separable metal mold 14, pre-charged with a predetermined amount of non-foamable plastic powder will be simultaneously rotated bi-axially and subjected to external heating until its plastic content melts and coats the internal surface of the mold without pressure or centrifugal force, thereby creating a skin that duplicates accurately the shape of the mold (FIG. 12). In contrast the current practice requires the foamable resin to be produced in a remote extrusion-based melt compounding operation involving a carrier resin and a chemical blowing agent to produce decomposition-free foamable solidified pellets. In the latter segment, non-chilled foamable extrudate will be directly "injected" into the uni-axially rotating mold 14 via a specially designed port 328, subsequent to which it will be externally cooled to solidify the product.

The main components of the extrusion assisted rotational foam molding system 300 will now be described in more detail.

Preferably extruder 312 is capable of melt compounding of CBAs with thermoplastic resins. Extruder 312 has a heated nozzle 330 that allows sealing its tip when not injecting the melt into the mold; this is to prevent the leakage of the compounded melt at stages of the process when the extruder is not in use. The extruder has an adjustable barrel temperature and screw RPM.

In one embodiment the extruder 312 is a 32 [mm] screw diameter with a compression ratio of 24:1. The extruder's drive system is equipped with a 7.5 HP motor with a torque delivery accuracy of ±1% and a maximum screw RPM value of 100. Preferably the extruder 312 includes a melt blending system to aid in the dispersion the CBA particles within the foamable resin. The bi-metallic lined barrel of the extruder contains seven temperature control zones. Three zones are in the barrel, one is in the melt blending system, one is in the adaptor, and two are in the die.

The rotary arm 16 as best seen in FIG. 13 is capable of rotating the mold 14 both uni-axially and bi-axially in a manner such that one rotation is about the central axis of the mold and the other rotation is about an axis perpendicular to the central axis. The RPMs of both the arm and mold rotation are controllable. Also, the arm components are capable of withstanding the high temperatures of the oven 18 and fit within the oven boundaries during the mold heating process.

During the extrudate injection phase, the output nozzle 330 on the extruder enters the mold 14, pierces the existing skin, and injects the extrudate. In one embodiment to facilitate this interconnection and to keep the extrudate in a molten state, a single cavity pneumatic valve gate hot runner was purchased from Husky and assembled at the extruder's output port. For sealing the mold immediately after the extrudate injection a "pizza" like valve 354 was created for this purpose and is shown in FIG. 13. Valve 354 facilitates the flow of extrudate from the extruder into the mold. Otherwise, the nature of the spring steel pizza valve 354 remains closed at all times. The valve is mounted between a pair of pizza valve securing discs 355 and a pizza valve mounting disc 356 to prevent its rotation during the injection process. Discs 355 and 356 act as a sandwich for the pizza valve 354 in order to retain the valve in place.

In one embodiment the material selected for pizza valve 354 was stainless steel shim of 2 [mm] thickness. This choice is due to its enhanced ductility, and thermal and corrosion resistance. High precision laser cutting was used to form the slits in the valve. Due to the pizza cut, the mold 14 will be initially sealed, then open with the pressure of the nozzle 330, and finally spring back into place upon the retraction of the nozzle, while sealing any voids by the solidified plastic. The pizza valve 354 has a plurality of radial slits 357 and in one embodiment is made from spring steel. Valve 354 could also be made from other resiliently deformable metals.

Preferably the oven 18 exhibits proportional-integral-derivative feedback control (PID) with a simple user interface to program the desired temperature profiles. Preferably the opening of the oven door 57 is possible both manually and in automatic mode in order to allow the entrance and exit of the rotating arm with the mold in a semi or fully automated manner.

Generally speaking, the systems described herein are directed to rotational molding. As required, embodiments of the present invention are disclosed herein. However, the disclosed embodiments are merely exemplary, and it should be understood that the invention may be embodied in many various and alternative forms. The figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. For purposes of teaching and not limitation, the illustrated embodiments are directed to rotational molding.

As used herein, the terms "comprises" and "comprising" are to be construed as being inclusive and opened rather than exclusive. Specifically, when used in this specification including the claims, the terms "comprises" and "comprising" and variations thereof mean that the specified features, steps or components are included. The terms are not to be interpreted to exclude the presence of other features, steps or components.

What is claimed as the invention is:

1. A molding process including the steps of:
    precharging a mold with a predetermined amount of non-foamable plastic powder;
    rotating and heating the mold in an oven until the plastic powder melts and coats the inside of the mold thereby producing a solid skin;
    removing the mold from the oven;
    injecting, directly from an extruder, foamable extrudate including a heat activated blowing agent into the mold and rotating the mold;
    reinserting the mold into the oven in order to induce decomposition of the heat activated blowing agent contained in the foamable extrudate and produce a foamed layer inside the solid skin; and
    cooling the mold to produce a foamed product with an outer skin.

2. The molding process as claimed in claim 1 wherein the heat activated blowing agent is a chemical blowing agent.

3. The molding process as claimed in claim 1 wherein in the rotating and heating step the mold is rotated biaxially and then the rotation is converted to uniaxial rotation prior to the injecting step.

4. The molding process as claimed in claim 1 wherein the foamable extrudate is a non-chilled extrudate.

5. The molding process as claimed 1 wherein the foamable extrudate is simultaneously prepared in an adjacent extruder.

* * * * *